US006711824B2

(12) United States Patent
Hruska

(10) Patent No.: US 6,711,824 B2
(45) Date of Patent: *Mar. 30, 2004

(54) BALE PROCESSOR TWINE CUTTER

(75) Inventor: Kevin Hruska, Gerald (CA)

(73) Assignee: Bridgeview Mfg. Inc., Saskatchewan (CA)

( * ) Notice: Subject to any disclaimer, the term of this patent is extended or adjusted under 35 U.S.C. 154(b) by 62 days.

This patent is subject to a terminal disclaimer.

(21) Appl. No.: 10/010,669

(22) Filed: Dec. 6, 2001

(65) Prior Publication Data

US 2002/0074436 A1 Jun. 20, 2002

Related U.S. Application Data

(60) Provisional application No. 60/256,248, filed on Dec. 18, 2000, and provisional application No. 60/260,531, filed on Jan. 10, 2001.

(51) Int. Cl.$^7$ ............................................. B26B 29/00
(52) U.S. Cl. ........................... 30/294; 30/299; 30/314; 30/329; 30/353
(58) Field of Search .......................... 30/294, 299, 314, 30/317, 329, 339, 353

(56) References Cited

U.S. PATENT DOCUMENTS

| 40,163 A | * | 10/1863 | Fitch | ........................... 30/294 |
| 118,571 A | * | 8/1871 | Wolfe | ........................... 30/299 |

(List continued on next page.)

FOREIGN PATENT DOCUMENTS

| CA | 2202014 | 10/1998 |
| CA | 2 350 266 | 2/2002 |

Primary Examiner—Allan N. Shoap
Assistant Examiner—Jason Prone
(74) Attorney, Agent, or Firm—Dinsmore & Shohl LLP

(57) ABSTRACT

The twine cutter for a bale processor comprises a blade holder has a front end and a back end, the holder further has a top edge that is bevelled to a wedge shape at the front end, a back edge and a base edge. A drive mechanism such as an elongated handle is fixed to the holder for driving the holder back or forth. A cutter blade is fixed to the holder such that a cutting edge is bevelled towards the front of the holder and a further cutting edge is bevelled towards the back of the holder thereby being able to cut twine when the holder is driven forward or backward. The cutter blade may further include a sharpened hook shaped section used to snag and cut twine. The hook shaped section can be positioned at the apex of the triangular upper portion of the single blade. A disintegrator roller for a bale processor comprises an elongated roller arranged to rotate in one direction about its axis with a number of flails intermittently spaced along the length and around the circumference of the roller. Each of the fails are mounted within a support that is fixed to the surface of the roller such that the flails pivot freely in a plane in their direction of rotation. The roller further includes a bar fixed to the surface of the roller and to the supports facing the direction of rotation of the roller. Support gussets may also be positioned between the supports and are fixed to the bar and the roller. The bars and the gussets are typically welded in place. The roller may also include bumpers for preventing the back of the flails from contacting the roller.

9 Claims, 11 Drawing Sheets

U.S. PATENT DOCUMENTS

| | | | | | |
|---|---|---|---|---|---|
| 129,247 | A | * | 7/1872 | Parsons et al. | 30/299 |
| 158,985 | A | * | 1/1875 | Schultz | 30/314 |
| 306,882 | A | * | 10/1884 | Watson | 30/353 |
| 1,244,746 | A | * | 10/1917 | Kinzel | 30/314 |
| 1,268,997 | A | * | 6/1918 | Pruett | 30/294 |
| 1,398,850 | A | * | 11/1921 | Franco | 30/314 |
| 1,411,899 | A | * | 4/1922 | Baker | 83/835 |
| 1,748,869 | A | * | 2/1930 | Drennan | 30/314 |
| 2,017,369 | A | * | 10/1935 | McGhee | 30/294 |
| 2,482,805 | A | * | 9/1949 | Stafford | 30/294 |
| 2,517,840 | A | * | 8/1950 | Chatlos | 30/314 |
| 2,693,028 | A | * | 11/1954 | Stoddard | 30/353 |
| 3,015,930 | A | * | 1/1962 | Campbell | 30/314 |
| 3,230,620 | A | * | 1/1966 | Embleton | 30/294 |
| 3,610,246 | A | * | 10/1971 | Salmon | 30/294 |
| 3,656,638 | A | | 4/1972 | Hutton et al. | |
| 3,831,274 | A | * | 8/1974 | Horrocks | 30/294 |
| 3,859,725 | A | * | 1/1975 | Anderson et al. | 30/294 |
| 3,893,238 | A | * | 7/1975 | Scholl | 30/294 |
| 3,918,158 | A | * | 11/1975 | Debski | 30/314 |
| 4,028,802 | A | * | 6/1977 | Houghton et al. | 30/294 |
| 4,068,804 | A | | 1/1978 | Butler et al. | |
| 4,432,138 | A | * | 2/1984 | Piccolo, Jr. | 30/294 |
| 4,551,897 | A | | 11/1985 | Holt | |
| 4,830,292 | A | | 5/1989 | Frey | |
| 4,951,883 | A | | 8/1990 | Loppoli et al. | |
| 5,025,992 | A | | 6/1991 | Niebur | |
| 5,044,081 | A | * | 9/1991 | Nguyen | 30/294 |
| 5,094,003 | A | * | 3/1992 | Schwab | 30/329 |
| 5,209,412 | A | | 5/1993 | Dwyer et al. | |
| 5,209,413 | A | | 5/1993 | Dwyer et al. | |
| 5,339,527 | A | * | 8/1994 | Clemens, Jr. | 30/299 |
| 5,347,719 | A | * | 9/1994 | Scharf | 30/294 |
| 5,414,933 | A | * | 5/1995 | Garner | 30/294 |
| 5,494,298 | A | * | 2/1996 | Maleski | 30/342 |
| 5,556,041 | A | | 9/1996 | Cheesman et al. | |
| 5,636,845 | A | * | 6/1997 | Newnam | 30/353 |
| 5,865,589 | A | | 2/1999 | Reyher et al. | |
| 5,896,667 | A | * | 4/1999 | Hawkins | 30/294 |
| 6,367,154 | B2 | * | 4/2002 | Degabli | 30/294 |

* cited by examiner

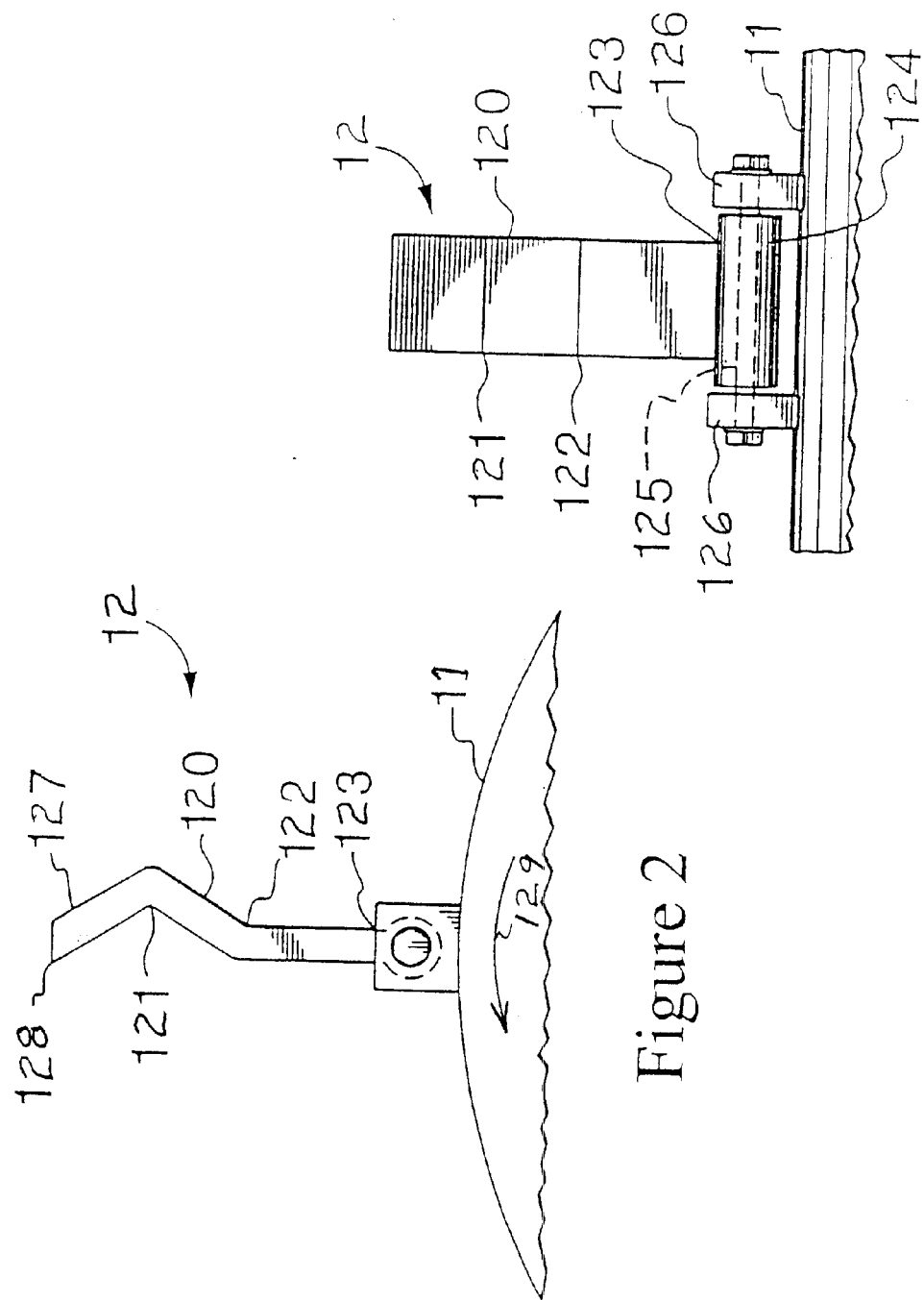

BALE PROCESSOR TWINE CUTTER

This application claims the benefit of U.S. Provisional Patent Application Ser. No. 60/256,248 filed on Dec. 18, 2000 and U.S. Provisional Application Ser. No. 60/260,531 filed on Jan. 10, 2001.

FIELD OF THE INVENTION

The invention relates generally to bale processors and more particularly to a bale processor system and apparatus for removing twine from the bale processor rollers.

BACKGROUND OF THE INVENTION

Bale processors have achieved widespread use for the shredding of both round and square bales as feed or bedding for animals since they represent a quick and efficient manner for operators to shred and distribute crop materials.

Both square and round bales are held together using twine or some other similar type of cord during storage. These cords are made to be very durable so that they will not deteriorate under various weather and storage conditions. For simplicity, the common term twine will be used in the present specification to cover all of the different types of cords used in baling crop materials.

Since the twine is required to be durable, it has been found that it is usually not cut up and discharged during the bale disintegration process, but rather wraps itself around one or other of the rollers in the bale processor. Since the disintegrator roller is the one that shreds the bale material and since it rotates so rapidly, the twine has a tendency to wrap itself around the disintegrator roller rather then any other part of the machine. Efforts have been made in the past to cut the twine away with a knife or an electric twine cutter. However, this process has been found to be time consuming and back-breaking since an operator has to climb into the processor itself and slash away at the twine that is tightly wrapped about the cylindrical roller.

To ease this burden, operators have been known to weld a rod along the length of the disintegrator roller so that the twine is lifted somewhat from its surface so that the twine may be more easily accessed for cutting. This had the effect of unbalancing the roller to some extent which could cause long term damage to the machine.

In Canadian Patent 2,202,014 which issued on Mar. 20, 2001 to Kjenner, a twine removing system is described wherein a "C" shaped track is welded to the disintegrator roller and a knife, which has laterally projecting feet to engage the track, is placed in and pulled through the track from one end of the roller to the other by a cable. The system further includes counterbalancing weights secured to the roller to maintain concentric shaft rotation. This system is somewhat unwieldy since it requires an opening to be cut in each of the front and back walls of the processor, and the roller must be rotated to line-up the track with the openings in the walls so that the track may be accessed from outside the processor. The cable must then be threaded through the track, which may be clogged with straw and other debris, followed by the knife. Finally, the end of the cable must be connected to a winch or some other motorized element to pull the knife through the guiding track. If all of the twine is not cut during the first pass, the process must be started over again. In addition, the track may be damaged by the flails as they swing back against the disintegrator roller.

Therefore, there is a need for a convenient and efficient bale processor system and apparatus for removing the twine from rollers of the bale processor.

SUMMARY OF THE INVENTION

The invention is directed to an apparatus for cutting twine that is wrapped around a bale processor roller. The twine cutter a blade holder has a front end and a back end, the holder further has a top edge that is bevelled to a wedge shape at the front end, a back edge and a base edge. A drive mechanism is fixed to the holder for driving the holder back or forth. A cutter blade is fixed to the holder such that a cutting edge is bevelled towards the front of the holder and a further cutting edge is bevelled towards the back of the holder thereby being able to cut twine when the holder is driven forward or backward.

In accordance with one aspect of the invention, the drive mechanism is an elongated handle with one end fixed to the holder back end.

In accordance with another aspect of the invention, the cutter blade has two sections, the first blade section is fixed to the front end of the holder and the second blade section is fixed to the back end of the holder. Alternately, the cutter blade is a single blade with the upper portion of the blade having a substantially triangular profile. One end of the blade is fixed to the front end of the holder and the other end is fixed to the back end of the holder. The cutter blade may further include a sharpened hook shaped section used to snag and cut twine. The hook shaped section can be positioned at the apex of the triangular upper portion of the single blade.

In accordance with a further aspect of the invention, the holder may be constructed of two planar sections with the cutter blade fixed between the two sections. Alternately, the holder may be a single planar section with the cutter blade fixed to one side of the planar holder section. The base edge may also be substantially planar or have a curvilinear cross-section.

The invention is further directed to a disintegrator roller for a bale processor. The roller comprises an elongated roller arranged to rotate in one direction about its axis with a number of flails intermittently spaced along the length and around the circumference of the roller. Each of the fails are mounted within a support that is fixed to the surface of the roller such that the flails pivot freely in a plane in their direction of rotation. The roller further includes a bar fixed to the surface of the roller and to the supports facing the direction of rotation of the roller. The cross-section of the bar may take any shape, typically it would have a substantially rectangular cross-section.

In accordance with another aspect of the invention, support gussets are positioned between the supports and are fixed to the bar and the roller. The bars and the gussets may be welded in place. The edge of the supports are at an angle $\theta$ to a plane perpendicular to the roller, where $0° \leq \theta \leq 30°$.

In accordance with a further aspect of this invention, the roller comprises an elongated roller arranged to rotate in one direction about its axis with a number of flails intermittently spaced along the length and around the circumference of the roller. Each of the fails are mounted within a support that is fixed to the surface of the roller such that the flails pivot freely in a plane in their direction of rotation. The roller further includes rubber bumpers mounted so as to prevent the back of the flail from contacting the roller. Each bumper may be a bar of high impact rubber mounted on the roller along its length.

The present invention is further directed to a system for cutting twine from the disintegrator roller in a bale processor that comprises a container having a back wall and a front wall, a disintegrator roller of the type outlined above that is mounted within the container between the back wall and the front wall and an opening located in the back wall and/or the front wall through which a twine cutter may be driven for cutting twine along the roller.

In accordance with another aspect of this invention, a twine cutter of the type outlined above is used to effectively cut twine wrapped around the roller.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein:

FIG. 2 is a partial end view of a disintegrator roller with a flail mounted thereon;

FIG. 3 is a partial side view of a disintegrator roller with the mounted flail;

DETAILED DESCRIPTION OF THE INVENTION

Figure 1:
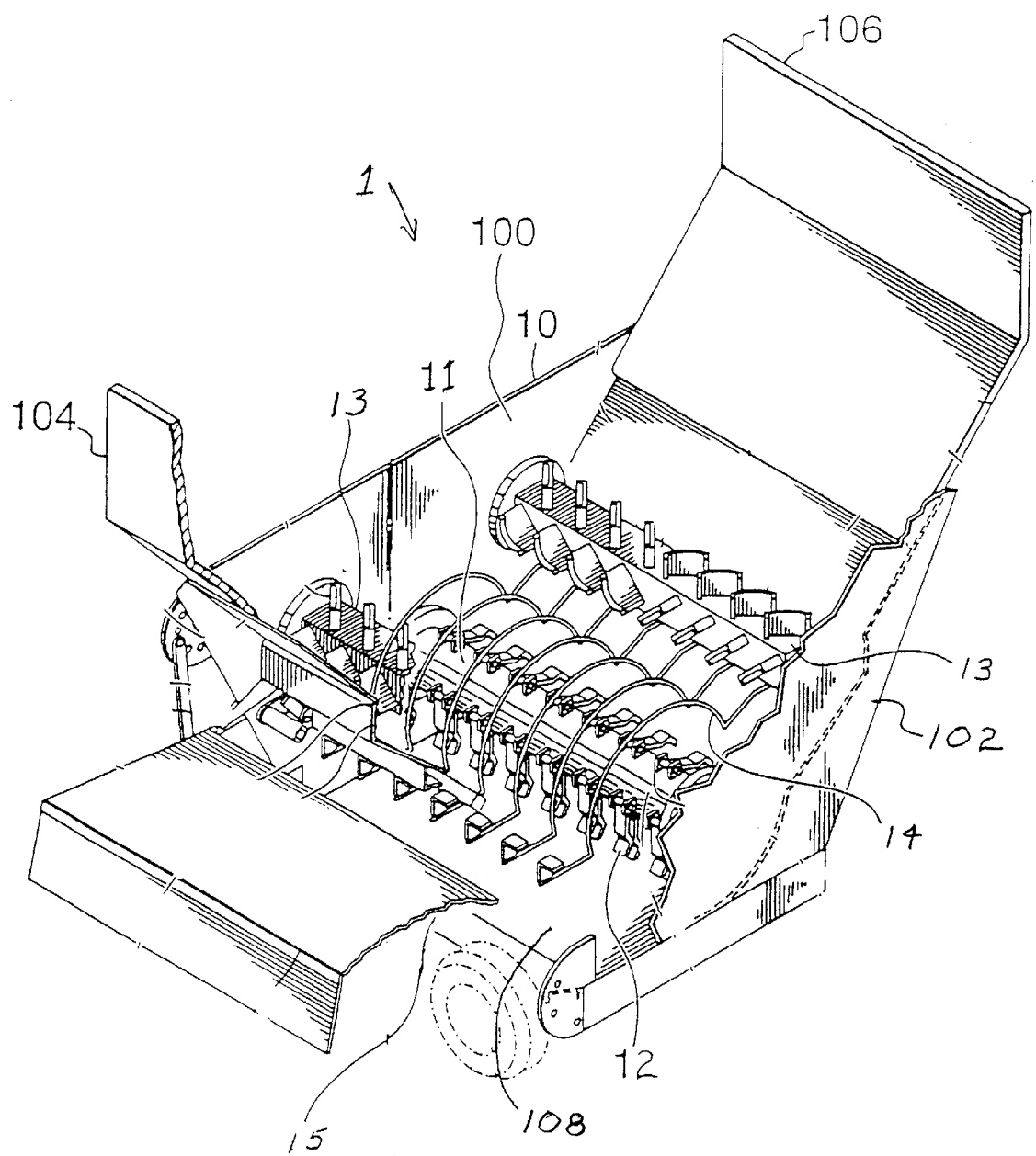
FIG. 1 is an isometric view of a bale processor.

FIG. 1 illustrates a typical bale processor described in U.S. Pat. Ser. No. 6,109,553 which issues on Aug. 29, 2000 and which is incorporated herein by reference. The bale processor 1 includes a container 10 having a front wall 100, a back wall 102, side walls 104 and 106 and a bottom 108. Processor 1 further includes a disintegrator roller 11 mounted within container 10 extending between the front wall 100 and the back wall 102. A number of flail 12 are mounted on the disintegrator roller 11 such that they are free to pivot in a plane in their direction of rotation. They are intermittently spaced along the length and around the circumference of the disintegrator roller 11 to maintain the rotational balance of the roller 11. The bale processor 1 further includes a number of manipulator rollers 13 which drive the bale over the disintegrator roller 11 and adjustable hoops 14 which maintain the bale at a desired distance above the disintegrator roller 11.

A discharge opening 15 is located at the bottom of the side wall 104 of the container 10 which in this case is on the left side of the processor 1. The discharge opening 15 is formed by wall 104, the bottom 108 and the end walls 100 and 102 such that the flails 12 on the flail roller 11 drive the shredded crop material along the bottom 108 to discharge it from the processor 1. Though in this particular example, the disintegrator roller 11 is shown as being centered within the container 10, it is often found to be near one of the side walls 104, 106 in other processors.

A flail 12 with its support is illustrated in FIGS. 2 and 3. Flail 12 comprises a solid metal bar 120 which has a rectangular cross-section in this embodiment and which is reverse bent at point 121 and 122. Flails 12 with other cross-sections may equally be used. One end 123 of the bar is welded to a hollow cylindrical section 124 for pivotally mounting by a bolt 125 to two supports 126. The supports 126 are welded to the roller 11. The other end 127 of the flail bar 120 is bevelled to provide a cutting or tearing edge 128. The reverse bend in the bar 120 allows it to lay close to the roller 11 when on its back; the cutting edge 128 faces the direction of rotation shown by arrow 129. Therefore in operation, with the roller 11 rotating at high speed, the flail 12 stands perpendicular to the flail roller 11 when it is not shredding a bale and then is forced backward when it hits the bale material.

Figure 4:
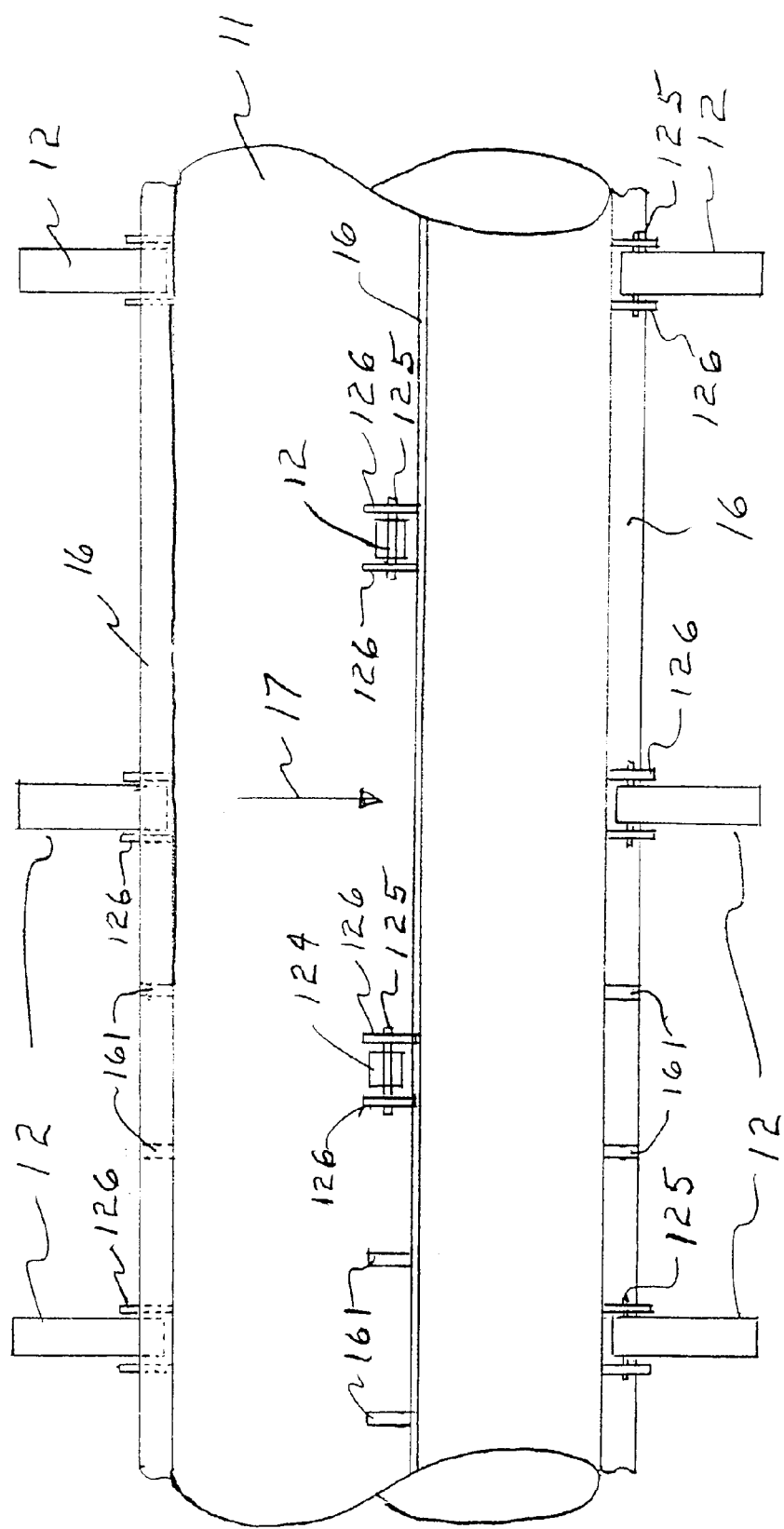
FIG. 4 illustrates an embodiment of an improved disintegrator roller in accordance with the present invention.

FIG. 4 schematically illustrates an improved disintegrator roller 11 in accordance with the present invention. As described with respect to FIGS. 1 to 3, a number of flails 12 are pivotally mounted and intermittently spaced along the length and around the circumference of the disintegrator roller 11 to maintain the rotational balance of the roller 11. Flails 12 are mounted to supports 126 by bolts 125 which pass through the cylindrical portion 124 of the flail 12 to allow the flail bar 120 to swing freely. The supports 126 are welded to the roller 11. In order to strengthen the supports 126, a bar 16 which may be rectangular in cross-section, such as a flat iron, is fixed to the leading side of the supports 126 and to the roller 11 as by welding. The leading sides of the supports 126 being the sides facing the direction of rotation. The direction of rotation of the roller 11 is represented by arrow 17. It is preferred that the surfaces of the bar 16 facing the supports 126 and the roller 11 be substantially flat for proper welding contact and therefore for the sake of simplicity, bars with a rectangular cross-section may be used. In a typical bale processor, the supports 126 may be in the order of 2¼ high and the bars 16 may be in the order of 2" wide and ¼" thick.

In order to strengthen the bar 16, gussets 161 may further be welded to the roller 11 and the bar 16 on the same side and in the same way that the supports 126 are welded. This will support the bar 16 from bending back during operation. For simplicity, only a few gussets 161 are shown, though they would be positioned along each of the bars 16 around the circumference of the roller 11. The gussets 16 may take the same shape as the supports 126 or any other shape such as triangular.

Figure 5:
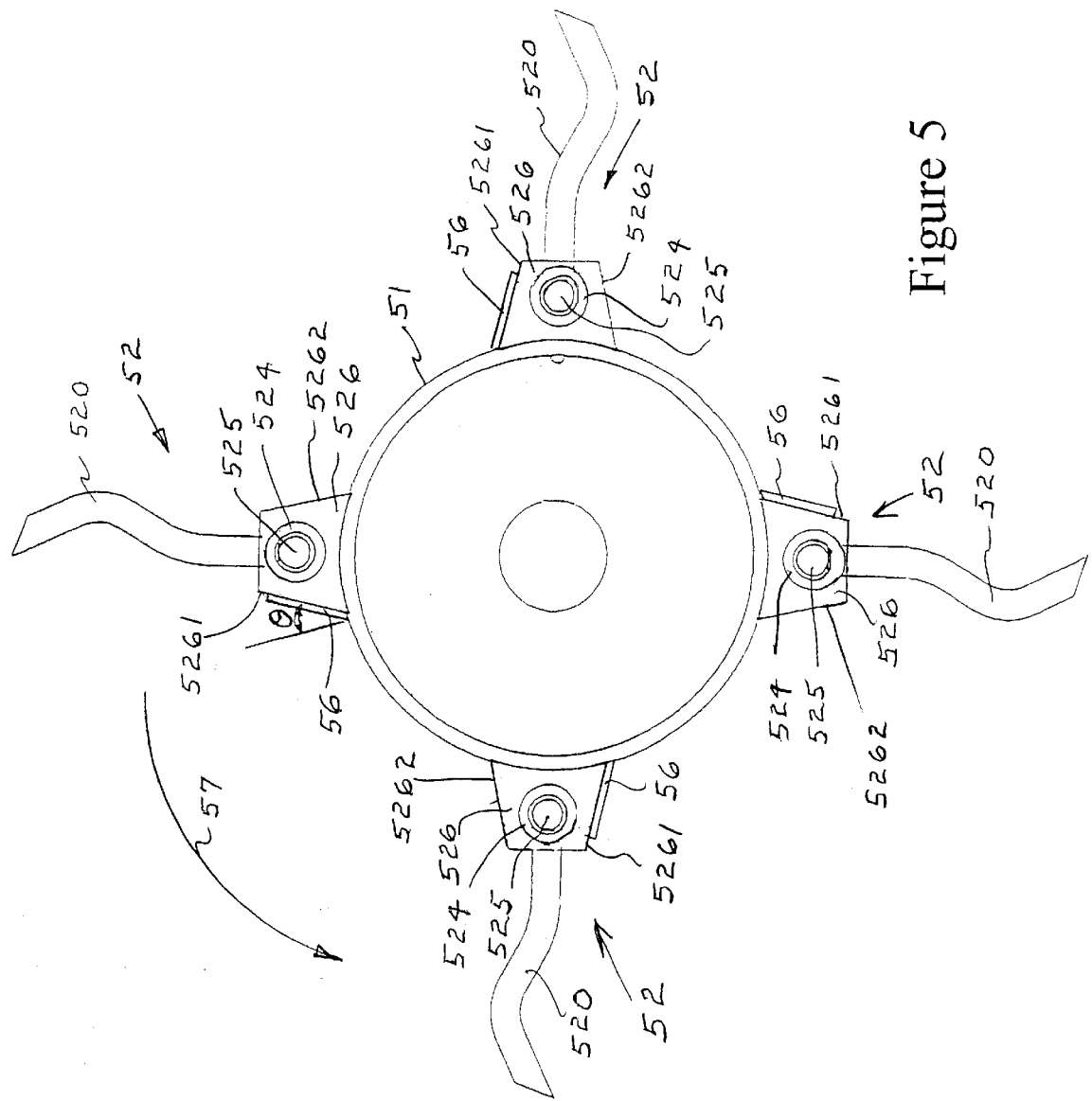
FIG. 5 illustrates a further embodiment of an improved disintegrator roller in accordance with the present invention.

FIG. 5 schematically illustrates, in end view, a further embodiment of a disintegrator roller 51 in accordance with the present invention. Similarly to the roller 11 described with respect to FIGS. 1 to 4, a number of flails 52 are pivotally mounted and intermittently spaced along the length and around the circumference of the disintegrator roller 51 to maintain the rotational balance of the roller 51. Flails 52 are mounted to supports 526 by bolts 525 which pass through the cylindrical portion 524 of the flail 52 to allow the flail bar 520 to swing freely. The supports 526 are welded to the roller 51. However, in this case the supports 526 do not have a profile that is substantially square. As in FIGS. 1 to 4, the edge of the support 526 which is welded to the roller 51 is curved to properly meet the roller 51; however, in addition, outside edges 5261 and 5262 are sloped at an angle θ to the perpendicular. Angle θ may be any appropriate angle, but is generally in the order of 0 to 30 degrees. Further, a bar 56 which may be rectangular in cross-section, such as a flat iron, is fixed to the leading edges 5261 of the supports 526 and to the roller 51 as by welding. The leading edges 5261 of the supports 526 face the direction of rotation as represented by arrow 57.

Bars 16, 56 provide particular advantage since they secure the leading edges of the supports 126, 526 which is the edge that encounters the greatest tensile stress to cause it to break away from the roller 11, 51. In addition, bars 16, 56 will assist in driving the disintegrated bale material out of the processor 1 by acting as a fan to cause air movement around the roller 11, 51. In operation, the flails 12, 52 swing away from the bars 16, 56 and therefore do not strike and damage the bars 16, 56. When the disintegrator roller 11, 51 is not rotating, some of the flails 12, 52 may be seen to be resting against the bar 16, 56, but would cause no damage to it. In addition, the bars 16, 56 provide the operator of the processor 1 an ideal location to cut twine that has wrapped itself around the roller 11, 51 since the bars 16, 56 hold the twine up from the roller 11, 51 surface. Further, the gussets 161 described with respect to FIG. 4 and which may also be applied to the roller 51 described with respect to FIG. 5 will allow a twine cutter to move freely along the side of the bar 16 opposite the supports 126 without catching on the welding bead which will not be necessary.

Though standard knives or shears may be used to cut the twine, twine cutters in accordance with the present invention make the task substantially easier, quicker and more convenient.

Figure 6:
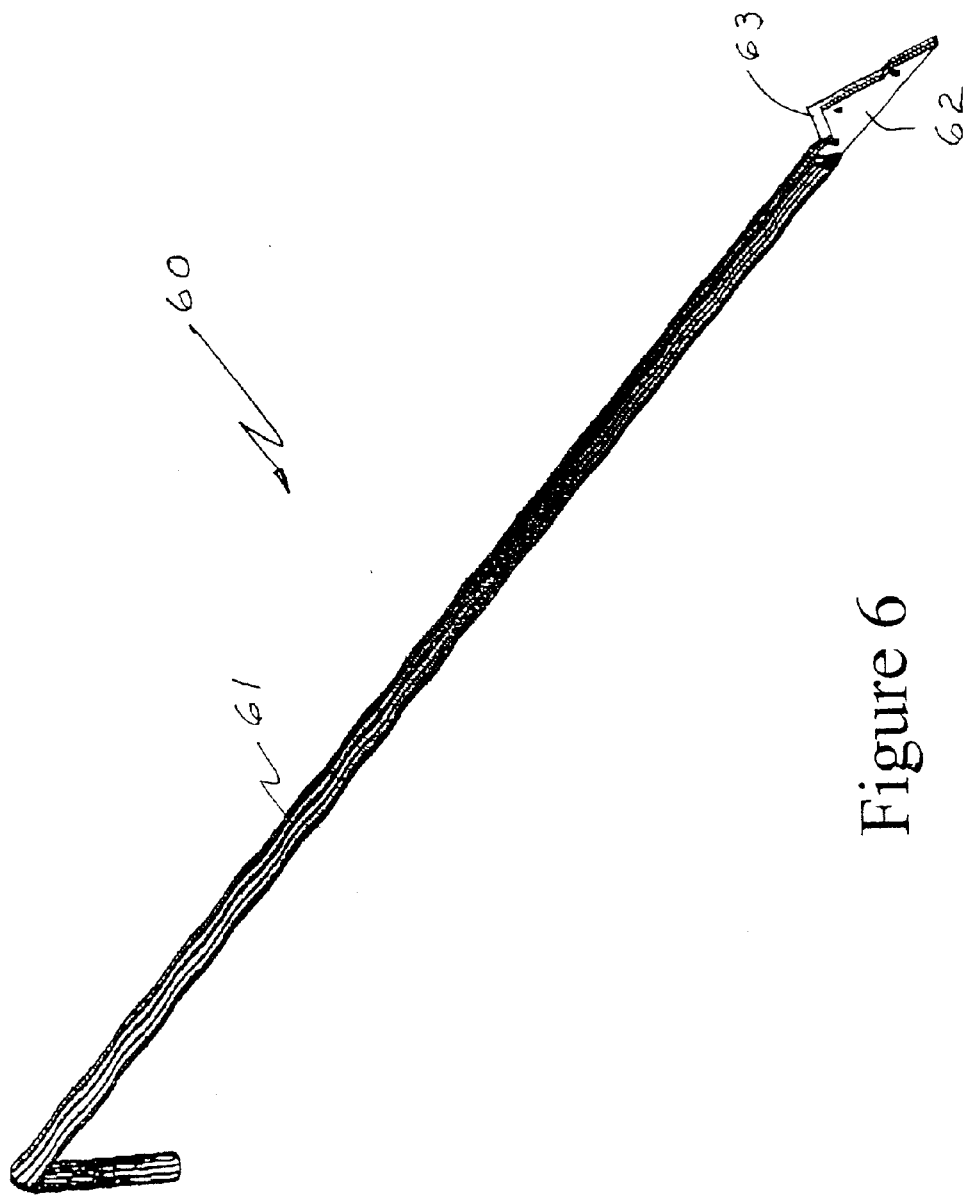
FIG. 6 illustrates an embodiment of a twine cutter in accordance with the present invention.

FIG. 6 generally illustrates a twine cutter 60 in accordance with the present invention. The twine cutter includes an elongated shaft or handle 61 to which is attached a blade holder 62 and a blade 63. The handle 61 must be longer then the length of the processor 1 such that cutter 60 can be pushed through the entire width of the processor 1. The handle 61 may be bent at one end to provide a firmer grip when pushing the cutter 60 into the processor 1. The handle 61 could be in the order of 90" long and made from a light ¾" to 1" aluminum pipe.

Figure 7:
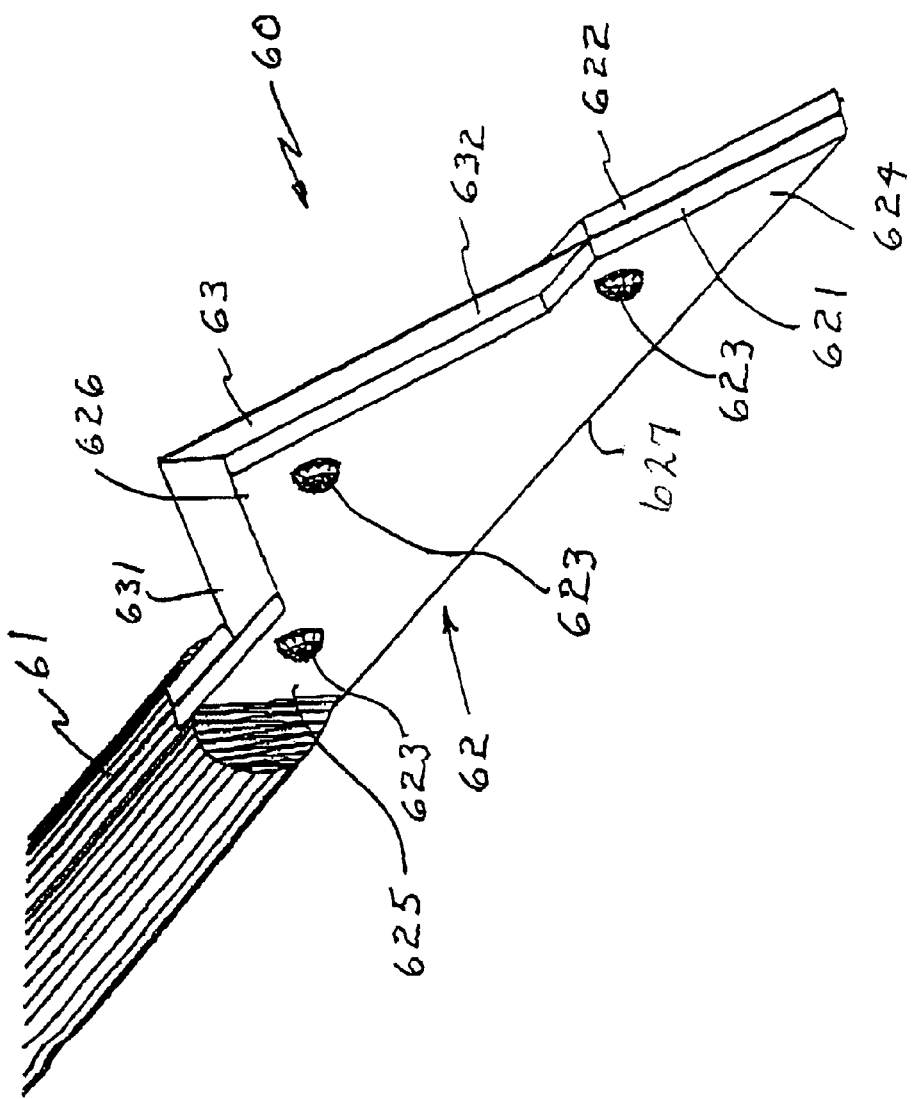
FIG. 7 is a detailed view of the twine cutter in FIG. 6.
Figure 8:
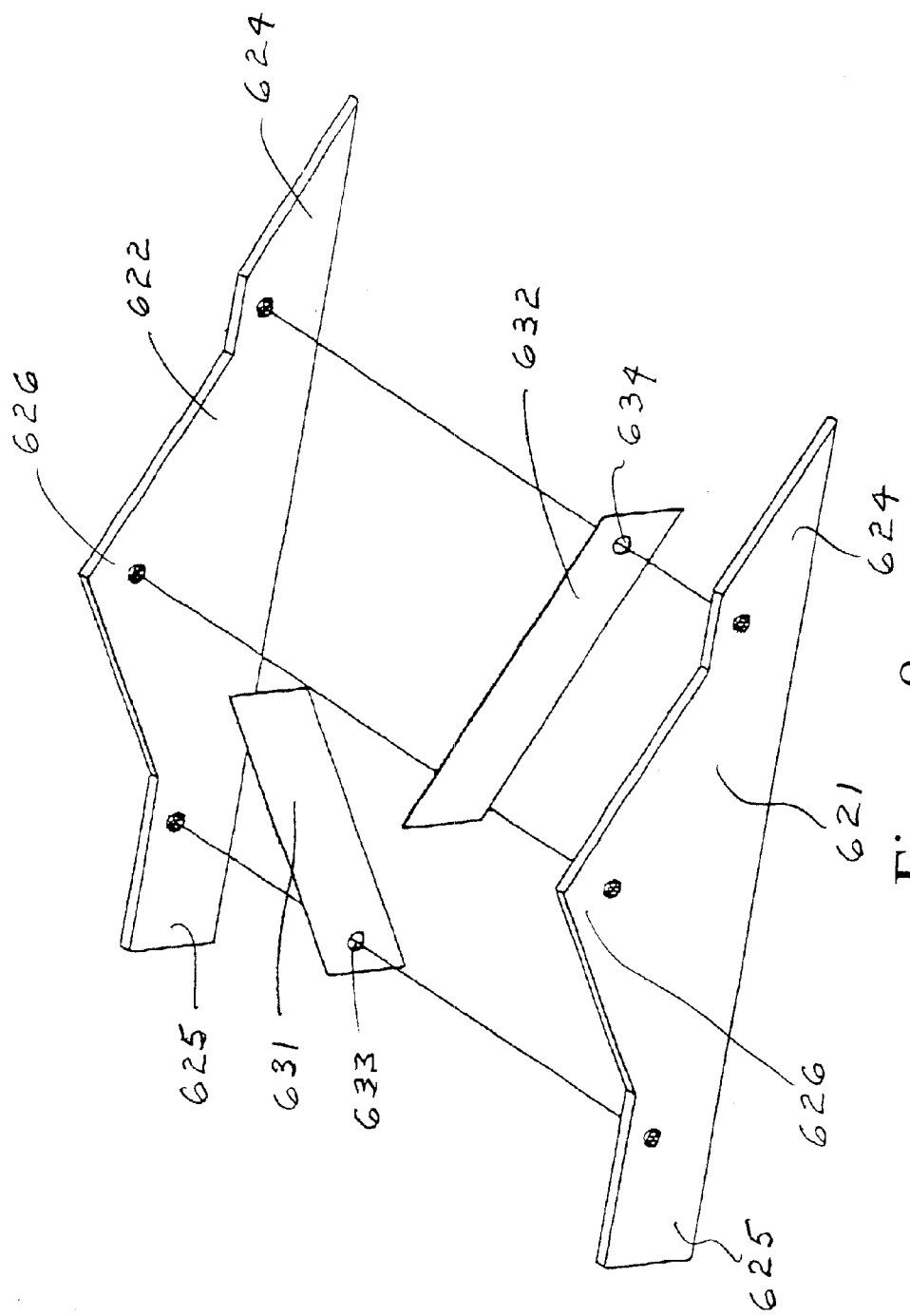
FIG. 8 is an exploded view of the twine cutter support and blades.

FIGS. 7 and 8 illustrate one embodiment of the twine cutter 60 in accordance with the present invention. The holder 62 is constructed in two similar sections 621, 622 that are held together by screws, bolts or other similar removable fastening devices 623. The sections 621 and 622 of the holder 62 are shaped such that the front end 624 are bevelled to a wedge shape such that the twine cutter 60 can be pushed along the surface of the roller 11, 51 and under the twine that is wrapped on it. The back end 625 of the holder 62 is shaped to be connected to handle 61. In addition to the top edge 626 of the holder 62 being bevelled down to a wedge at the front 624 of the holder 62, the top edge 624 is also bevelled down the back end 625 to the handle 61. The bottom edge 627 of the holder 61 is planar to slide over the surface of the roller 11, 51.

Figure 10:
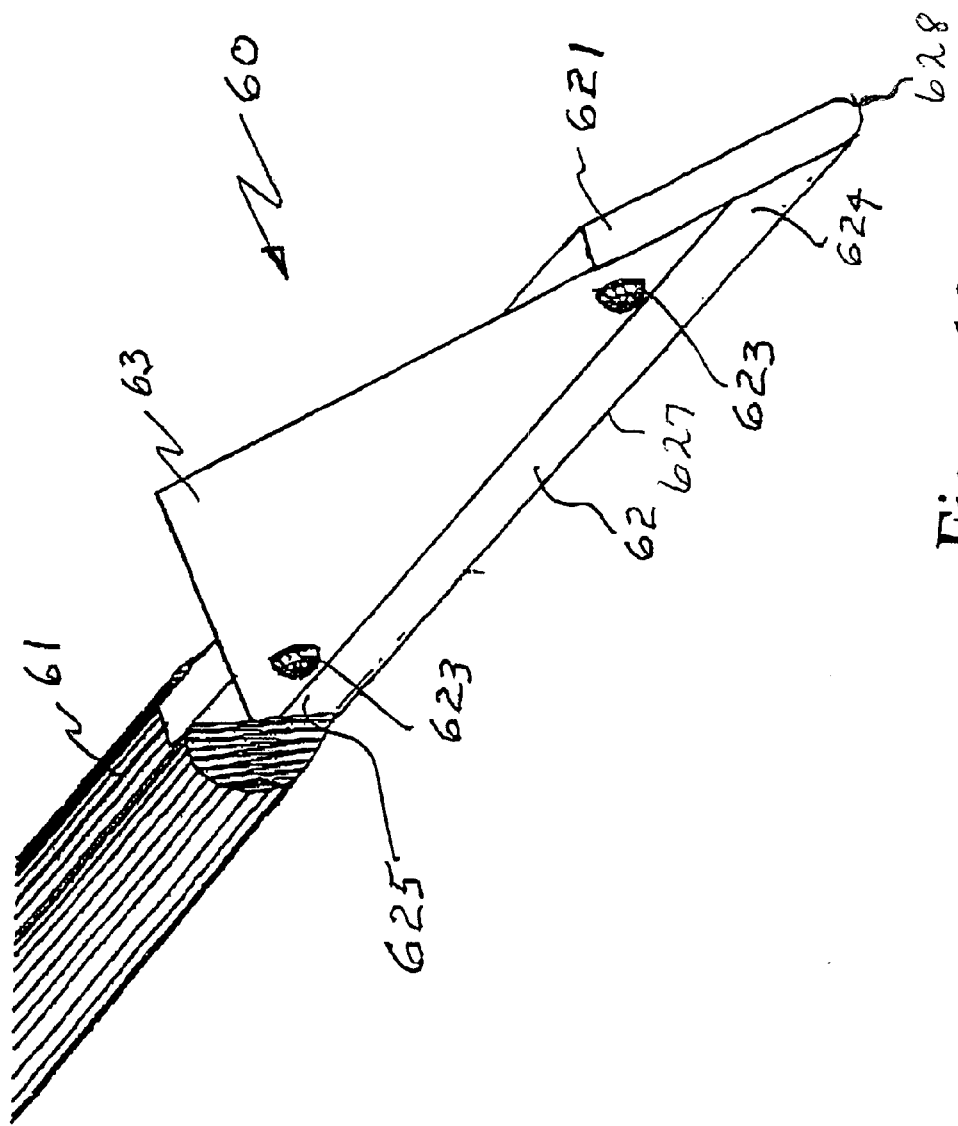
FIG. 10 illustrates a further embodiment the twine cutter in accordance with the present invention.

The blade 63 is illustrated to have two blade sections 631 and 632 which each have an opening 633 and 634 at one end through which the fasteners 623 will pass to sandwich the blade sections 631 and 632 in the holder 62. The other ends of the blade sections 631 and 632 will butt up to one another and rest on the central fastener 623. Alternately, the blade 63 may have a single blade with a triangular profile for example, as shown in FIG. 10, where two of the angles are fixed to the holder 62 by the fasteners 623 and the central fastener 623 might be eliminated. With such a one piece blade, the blade 63 could also be fastened to a single holder section 621 rather then two, also as shown in FIG. 10. The holder sections 621 and 622 may be made from an appropriate material such as aluminum or steel and be in the order of ⅛" to ¼" thick. The latter thickness would be appropriate in a holder 63 having a single holder section 621.

In operation, as the cutter 60 moves along the surface of the rotor 11, 51, the twine mounts over the wedge in the holder 62 and is cut by the blade 63 as the twine is forced against it. With the blade 63 sloping to the front and the back of the cutter 60, it will cut twine as it moves in either direction. The cutter 60 may be pushed or pulled along surface of the disintegrator roller 11, 51 using the handle 61 or by some other mechanism if desired.

Figure 9:
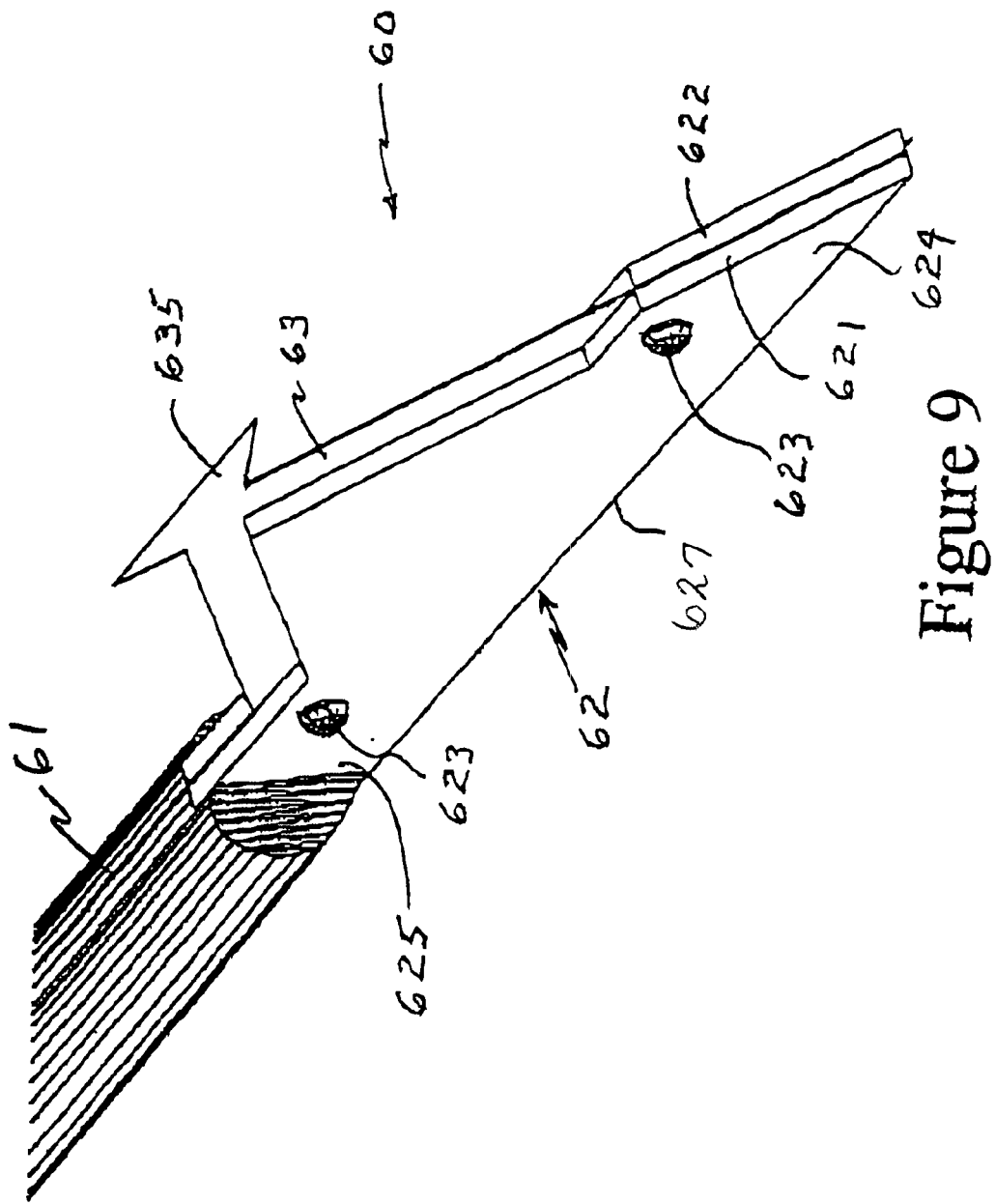
FIG. 9 illustrates a second embodiment of a twine cutter.

In order to assure the effective cutting of twine that is not tightly wrapped about the roller 11, 51, the blade 63 may be provided with a hook-like shape 635 on the cutting edge of the blade 63 As illustrated in FIG. 9, the hook shape 635 may be located at the highest point on the blade 63, however, it may also be forward or aft of the highest point since the purpose of the hooked cutting edge 635 is to snag loose twine and then cutting it.

In order to move the cutter 60 along the surface of the roller 11, 51, an opening is made in the back wall 102 or the front wall 100 of the processor 1 shown in FIG. 1. Also, in order to be able to guide the cutter along the surface of the roller 11, 51, it may be desirable to attach a guide to the wall 100, 102 to provide support for the handle 61 as the cutter 60 is driven into the processor 1. Further, openings may be made in walls 100 or 102 near the manipulator rollers 13 if it desired to remove twine from these rollers.

The twine cutters 60 described in conjunction with FIGS. 7 to 9 are particularly useful with the disintegrator roller 11, 51 described in conjunction with FIGS. 4 and 5. When an operator wishes to clear the twine from the roller 11, 51, he will cut the power from the processor 1, insert the cutter 60 into the processor 1 through the opening in the processor wall 100 or 102 and push the flat edge 627 of cutter 60 under the twine near one of the bars 16, 56. If the twine is particularly difficult to cut, he may move the cutter 60 back and forth along the bar 16, 56 thereby using both the front and back edges of the cutter blade 63 For twine that is loosely wrapped around the roller 11, 51, cutter 60 with the hook-shaped blade 635 would be particularly useful.

While cutting twine from a roller 11, 51 installed with bars 16, 56, the square edge of cutter 60 will have a tendency to be forced against the bar 16, 56 by the twine which is being held up by the bar 16, 56 at an angle to the surface of the roller 11, 51. FIG. 10 illustrates a modification to the cutter 60 wherein the bottom edge 627 of the holder 62 has curvilinear cross-section such as semicircular or elliptical. The shape of the bottom edge 627 results in a curved edge 628 at the front end 624 of the holder 62 that will permit the operator to more readily push the cutter 20 at an angle of up to 45 degrees to the surface of the roller 11, 51 and to the face of the bar 16, 56. Rather then having two 90 degree corners at the base of the cutter 60 rubbing against the surface of the roller 11, 51 and the face of the bar 16, 56, a curved non-prying edge would be in contact with the surface of the roller 11, 51 and the face of the bar 16, 56, resulting in an easier more efficient twine cutting operation.

As described with respect to FIGS. 2, 4 and 5, the flails 12, 52 pivot in the supports 126, 526 such that at high speed, they stand perpendicular to the roller 11, 51. However, as the flails 12, 52 strike the crop material in the processor 1, they are whipped backward such that the back of the flail 12, 52 may strike the surface of the roller 11, 51. In addition, when a bale has been processed and the roller 11, 51 is made to decelerate, the weight of the flails 12, 52 causes them to drop backward against the roller 11, 51. In the initial situation, repeated striking of the flails 12, 52 onto the roller can eventually cause damage to the roller 11, 51 and in both cases, the flails 12, 52 striking metal on metal cause a load noise.

Figure 11:
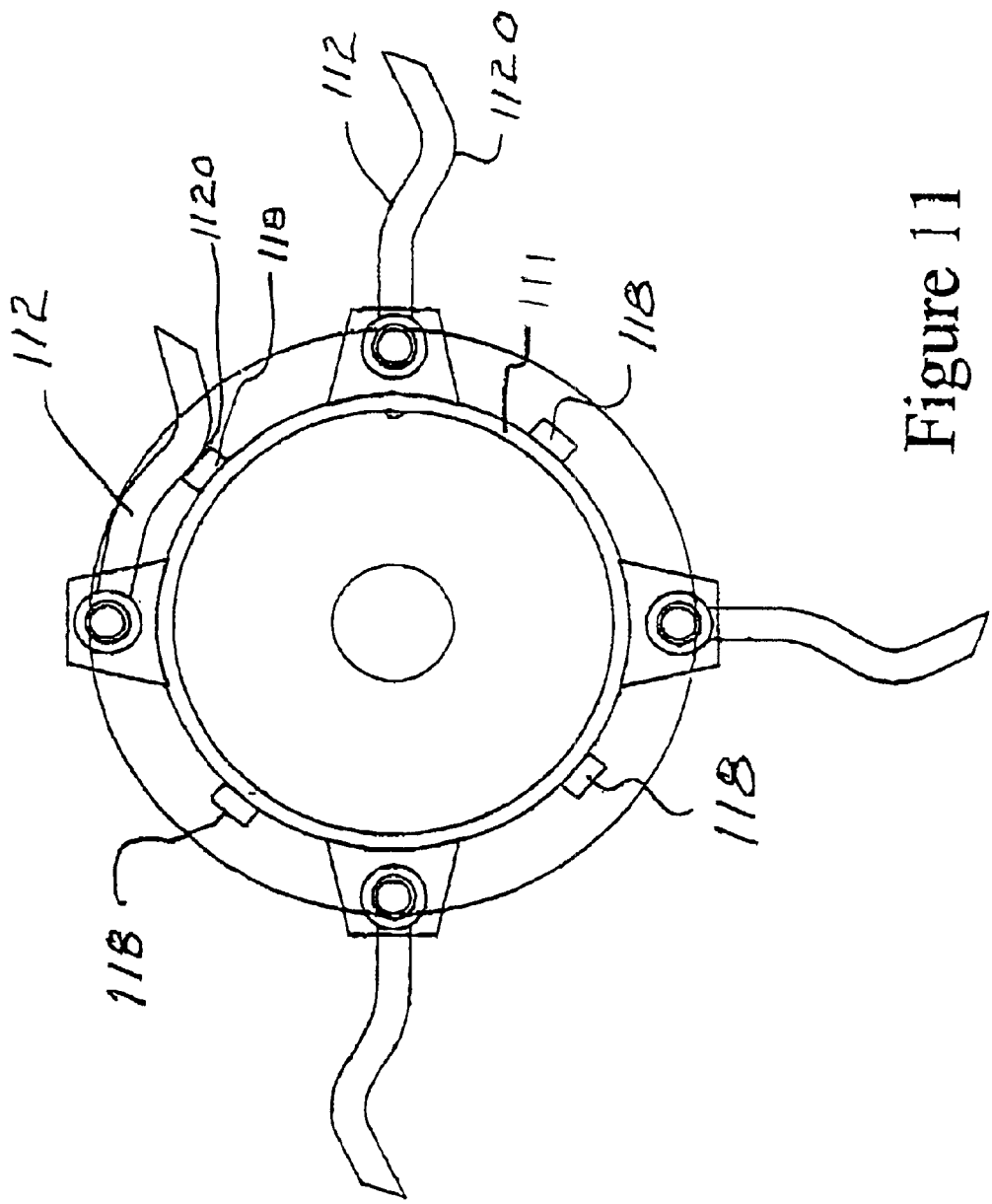
FIG. 11 illustrates an embodiment of the disintegrator roller with bumpers.
Figure 12:
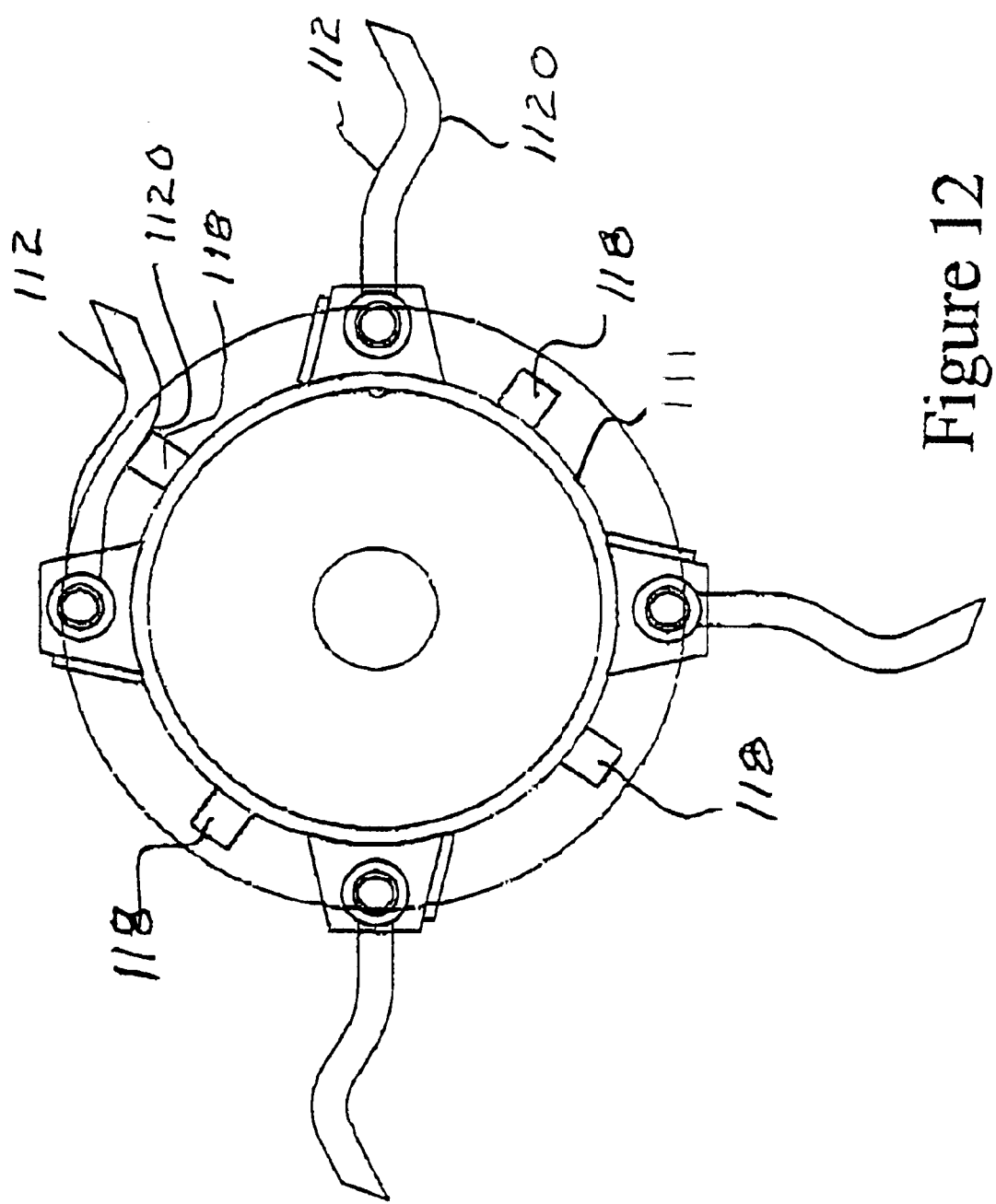
FIG. 12 illustrates a further embodiment of the disintegrator rollers with bumpers.

FIG. 11 illustrates a flail roller 111 similar to roller 11 in FIG. 2 and FIG. 12 illustrates a flail roller 111 similar to roller 51 in FIG. 5. The flail rollers 111 in FIGS. 11 and 12 include a bumper 118 made from a tough elastic substance 118, such as impact rubber, mounted on the rollers 111 at a location such that the back 1120 of the flail 112 will strike the bumper and/or come to rest on it when the flail is whipped back or drops back towards the roller 111. The bumper 118 may be of any appropriate size and shape to absorb the impact of the flail 112. For example, the cross-section of the bumper 118 in FIG. 11 may be in the order of 1" by ½" while the bumper in FIG. 12 may be in the order of 1" by 1". Bumpers 118 may have a length slightly greater than the width of the flail 112 such that the entire width of the flail 112 strikes the bumper 118 material. Alternately, bumper 118 may be a bar of impact rubber which runs the length of the roller 11, 51 to provide a bumper for all of the flails 112 in a row along the length of the roller 111. Such a bumper 118 can be fixed to the roller 11, 51 more readily, would have greater strength to absorb the impact of the flails 112 and could also be used to remove the twine wrapped around the roller 11, 51 in much the same manner as the bars 56 described with respect to FIG. 5.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. Apparatus for cutting twine from a bale processor roller comprising:

a blade holder comprising at least one planar section having a front end and a back end, the holder having a top edge bevelled to a wedge shape at the front end and further bevelled to a back edge at the back end, and a base edge between the front end and the back end;

means fixed to the holder for driving the holder back or forth; and cutter blade means fixed to the holder to have a cutting edge bevelled towards the front end of the holder and a further cutting edge bevelled towards the back end of the holder thereby adapted to cut twine when the holder is driven back or forth.

2. Apparatus for cutting twine as claimed in claim 1 wherein the driving means comprises an elongated handle with one end fixed to the holder back end.

3. Apparatus for cutting twine as claimed in claim 1 wherein the blade means includes a sharpened hook shaped section on the cutting edge of the cutter blade means adapted to snag and cut twine.

4. Apparatus for cutting twine as claimed in claim 1 wherein the blade means includes a first blade section fixed to the front end of the holder and a second separate blade section fixed to the back end of the holder.

5. Apparatus for cutting twine as claimed in claim 1 wherein the holder comprises two planar sections and the cutter blade means is fixed between the two sections.

6. Apparatus for cutting twine as claimed in claim 1 wherein the base edge is substantially flat in cross-section.

7. Apparatus for cutting twine as claimed in claim 1 wherein the base edge of the holder has a curvilinear cross-section between the front end and the back end of the holder.

8. Apparatus for cutting twine as claimed in claim 1 wherein the blade means comprises a single blade having a substantially triangular profile and adapted to have one end fixed to the front end of the holder and the other end fixed to the back end of the holder.

9. Apparatus for cutting twine as claimed in claim 8 wherein the blade means includes a sharpened hook shaped section positioned on the cutting edge of the cutter blade means adapted to snag and cut twine.

* * * * *

UNITED STATES PATENT AND TRADEMARK OFFICE
CERTIFICATE OF CORRECTION

PATENT NO. : 6,711,824 B2  Page 1 of 1
DATED : March 30, 2004
INVENTOR(S) : Hruska It is certified that error appears in the above-identified patent and that said Letters Patent is hereby corrected as shown below:

<u>Title page,</u>
Item [*] Notice, should read
-- Subject to any disclaimer, the term of this patent is extended or adjusted under 35 U.S.C. 154(b) by 62 days. --;

<u>Column 4,</u>
Line 42, "2 1/4 high" should read -- 2 1/4" high --.

Signed and Sealed this

Twenty-first Day of March, 2006

JON W. DUDAS
*Director of the United States Patent and Trademark Office*